April 12, 1960  G. P. PEED, JR., ET AL  2,932,224
WIRE STRIPPER AND CUTTER
Filed April 17, 1958
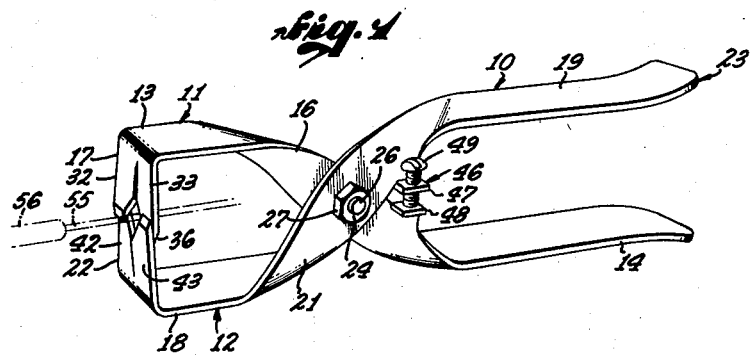
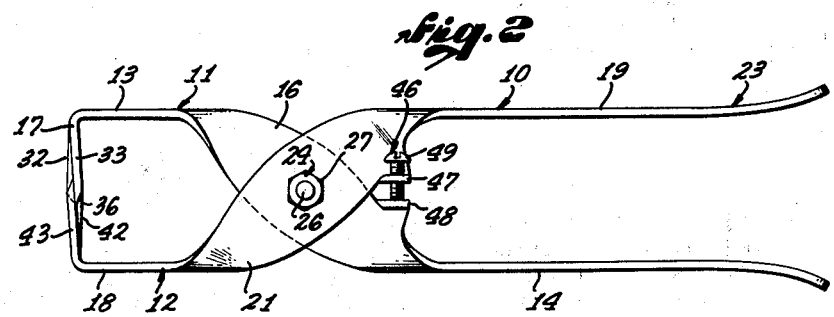
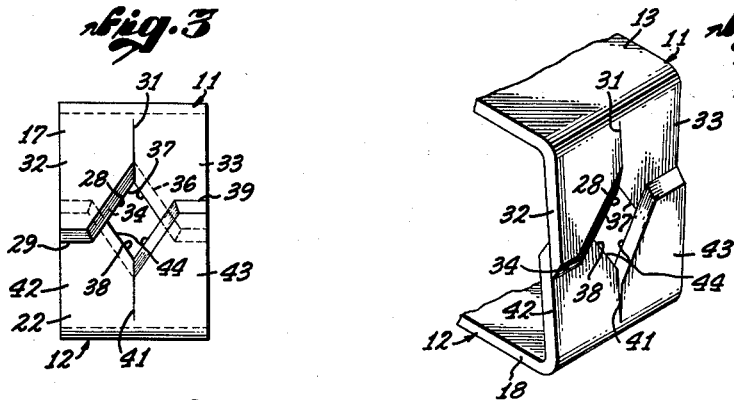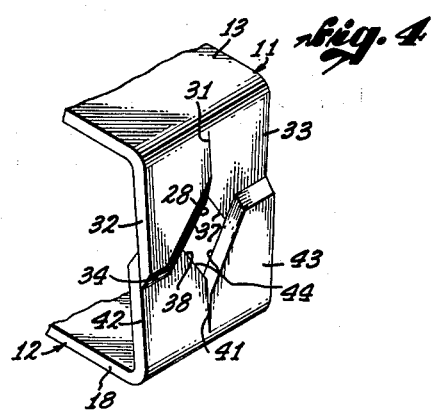
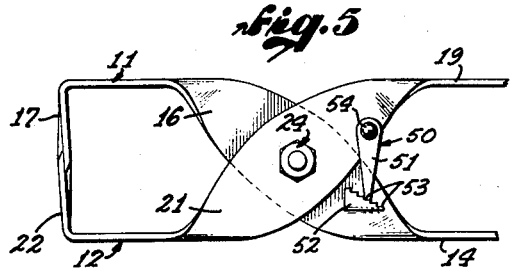
GARLAND P. PEED, JR. &
JOSEPH HIRSCH,
INVENTORS.
HERZIG & JESSUP,
ATTORNEYS.
BY United States Patent Office 2,932,224
Patented Apr. 12, 1960

2,932,224

WIRE STRIPPER AND CUTTER

Garland P. Peed, Jr., and Joseph Hirsch, Pacific Palisades, Calif.; said Garland P. Peed, Jr., assignor to Joseph Hirsch Application April 17, 1958, Serial No. 729,191

4 Claims. (Cl. 81—9.5)

This invention relates to a wire stripper and cutter, and more particularly to an end-type wire stripper and cutter which can be used to strip the insulation from an insulated conductor and/or selectively cut or sever the conductor itself.

The conductors of a cable or a multi-conductor installation are generally provided with a coating or jacket of insulation material to insulate the conductor from surrounding or adjacent conductors. This insulation is generally formed of a tough, resilient material such as rubber, neoprene, plastics or the like, which must be removed from the ends of the conductors when such ends are to be connected as to a terminal of an electrical connection. The insulation material surrounding the conductor is generally difficult to remove, particularly in the case of a plastics or rubber-like covering which sometimes tightly adheres to the conductor. Care must be exercised during such removal to avoid injuring and thereby weakening the conductor itself.

Whereas many cutting and stripping tools have been previously devised, they are mainly of the side type of cutters and strippers, wherein the tool is angularly positioned relative to the wire during the operation thereof. This position is relatively and frequently awkward and cumbersome, and requires a comparatively greater force to strip the insulating material from the conductor. Such a position also tends to bend or curl the wire during the stripping operation requiring time-consuming straightening operations in many installations.

A particular disadvantage in some instances of prior art tools is the provision for cutting blades which are brought into abutment or into overlapping engagement to achieve the stripping or cutting operation, causing the blades to separate and therefore become less efficient during use.

It is therefore an object of this invention to provide a new and improved end-type stripping and cutting tool which enables an operator to apply the tool and exert the force necessary to strip the insulation from the conductor along the longitudinal axis of the conductor whereby a lesser and/or more convenient force is required to strip the insulation.

It is a further object of this invention to provide a new and improved stripping and cutting tool in which the cutting blades and the cutting edges thereof interlace in a complementary manner, wherein the blades of one jaw of the tool provide a shearing action with the blades of the other jaw, one blade supporting and guiding another and tending to retain an intimate contact to secure a more efficient shearing action than has been heretofore achieved.

Another object of this invention is to provide a stripping and cutting tool of the character described, which provides means for adjusting the depth of the cut of the blades to accommodate conductors of various sizes.

It is a still further object of this invention to provide a stripping and cutting tool which is economical to manufacture, capable of mass production and interchangeability of parts thereof.

A further object of this invention is to provide a new and improved stripping and cutting tool which is adjustable to accommodate conductors of different sizes, yet which can be easily and readily converted into a cutting tool for severing the conductor itself.

An additional object of this invention is to provide a stripping and cutting tool incorporating a new and improved unitary construction wherein the jaws and blades thereof are integral with the handles and whereby the cost of manufacture is reduced, assembly is simplified, and greater accuracy of alignment of the cutting blades is provided.

A general object of this invention is to provide a new and improved stripping and cutting tool which overcomes disadvantages of prior means and methods heretofore intended to accomplish generally similar purposes.

These and other objects of this invention will be more apparent to one skilled in the art from the following description of the drawings and appended claims.

In the drawings:

Fig. 1 is a perspective view, in elevation, of a preferred embodiment of this invention;

Fig. 2 is a side view, in elevation, of the embodiment shown in Fig. 1;

Fig. 3 is an enlarged end view, in elevataion, as seen from the left side of Fig. 2;

Fig. 4 is an enlarged fragmentary perspective view showing the jaws and their cutting blades in greater detail; and Fig. 5 is a fragmentary side view, in elevation, of another embodiment in accordance with this invention.

Referring to the drawings, and more particularly to Figs. 1 through 4, there is shown by way of illustration, but not of limitation, a wire stripping and cutting tool generally indicated by the numeral 10. The tool 10 generally comprises a pair of unitary members 11 and 12, each unitary member being formed from a substantially flat elongated strip of metal or other suitable material.

The member 11 includes a forwardly extending portion 13, a rearwardly extending portion 14 and an intermediate portion 16. The portions 13 and 14 are arranged substantially in parallel planes and are offset from each other by the intermediate portion 16 which is preferably bent or twisted into a plane substantially normal to the planes of the portions 13 and 14. The portion 13 is bent inwardly, towards the portion 14, to form an inwardly extending jaw 17. The portion 14 forms a part of the handle 23 as will be hereinafter described.

The member 12 is formed similarly to the member 11, and includes a forwardly extending portion 18, a rearwardly extending portion 19 and an intermediate twisted portion 21 which offsets the portions 18 and 19 into spaced substantially parallel planes. The forwardly extending portion 18 is bent inwardly, towards the member 11, to form a jaw 22, while the rearwardly extending portion 19 forms a handle portion complementary to the rearwardly extending portion 14 of the member 11, thus forming the complete gripping handle member 23.

The members 11 and 12 are pivotally joined together at the intermediate portions 16 and 21, respectively, as by a fastening member 24 extending through apertures of the intermediate members. The fastening member 24 may be in the form of a bolt 26 and a nut 27 shown, or optionally as a rivet, or the like.

It will be understood by the foregoing description that the unitary members 11 and 12 are pivotally joined at their intermediate portions, and include rearwardly extending handle portions 14 and 19, respectively, and inwardly extending jaws 17 and 22 at their forward ends 13 and 18, respectively. By this construction, as the handle elements 14 and 19 of the handle 23 approach each other as by a manual gripping action of an operator's hand, the jaws 17 and 22 are converged. Conversely, as the handle elements 14 and 19 are separated, the jaws 17 and 22 are separated.

As may be most clearly seen in Figs. 1, 3 and 4, the jaw 17 of the unitary member 11 is bifurcated by a V-shaped cut-out 28 at its inner end 29. A slit or cut 31 preferably extends longitudinally thereof and communicates with the apex of the cut-out 28 to form discrete cutting blades 32 and 33. The cutting blades 32 and 33 are angularly disposed relative to each other so that the blade 32 extends forwardly, and the blade 33 extends rearwardly. Each blade 32, 33 is preferably beveled, the blade 32 being beveled along its outer edge as indicated at 34 and the blade 33 being beveled at its inner edge indicated at 36, to form sharp edges 37 thereon.

The inwardly extending jaw 22 of the member 12 is similarly formed with a V-shaped cut-out 38 at the inner end 39 of the jaw and a longitudinal slit 41 to bifurcate the jaw 22 into discrete cutting blades 42 and 43. The blades 42, 43 are angularly disposed relative to each other, the inner end of the blade 42 extending rearwardly, and the inner end of the blade 43 extending forwardly.

The blades 32, 33 of the jaw 17 and the blades 42, 43 of the jaw 22, are angularly disposed relative to each other so that when the jaws 17 and 22 are brought into engagement, the cutting blade 32 overlies the cutting blade 42 while the cutting blade 43 overlies the cutting blade 33. The cutter blades 42 and 43 are beveled to form cutting edges 44 which are opposed to the cutting edges 37, and in substantially the same plane.

As can best be seen in Figs. 1, 2 and 4, as the jaws 17 and 22 approach each other, an effective scissors action is achieved between the cutting edges 37 and 44, the blades being angularly aligned. As the jaws 17 and 22 are advanced, the blades 32 and 42 and the blades 33 and 43 are forced into closer contact. This unique scissors action is much more efficient than the conventional scissors action wherein blades overlap throughout their length and are susceptible to the spreading-apart action of the material which is being cut. The further the jaws 17 and 22 are forced together, the more intimate the contact between the opposing blades is made.

In order to facilitate the use of the instant tool 10 on conductors of various sizes, adjustment means 46 is preferably provided on the handles 23 to selectively limit the spacing of the handles, and thereby limit the distance between the apices of the cut-outs 28 and 38. As best seen in Figs. 1 and 2, a tab 47 is integrally formed with or attached to the intermediate portion 21 of the element 12 and includes a threaded aperture. A tab 48 is similarly formed on the intermediate portion 16 of the member 11 to form an abutment stop. A threaded member 49 is provided in the aperture of the tab 47 and extends therethrough to abut the tab 48 in selective adjusted positions. As the handles 19 and 14 are moved towards each other, the lower end of the threaded member 49 is brought into contact with the stop 48 to limit the movement of the handles. The member 49 may be threaded in or out to vary the travel of the jaws in accordance with the size of the conductor to be stripped. If it is desired to cut the conductor, the member 49 may be withdrawn to permit a full scissors action of the cutting blades.

Referring to Fig. 5, another embodiment, in accordance with this invention, is illustrated, wherein parts which are similar or identical to parts of the first embodiment are referred to by like numbers. In this instant embodiment, a stop means 50 is illustrated including a pawl 51 rotatably mounted on the intermediate portion 21 of the member 12 and extensible towards a stop 52 formed integrally with the intermediate portion 16 of the member 11, or optionally attached thereto. The stop 52 includes a plurality of steps 53 facing towards the pawl 51 and engageable by the pawl. If desired, the steps may be identified by suitable indicia (not shown) corresponding to various sizes of conductors. The pawl 51 is capable of being positioned in alignment with one of the steps like 53, to limit the movement of the handle element 19 and 14 to limit the travel of the jaws when stripping the insulation from a conductor.

If it is desired to cut or sever a conductor, the pawl 51 may be swung rearwardly to completely clear the stop 52, whereby the jaws 17 and 22 may be advanced sufficiently to sever the conductor. If the insulation for a conductor of a small diameter is to be stripped, the pawl 51 is swung into alignment with a lower step 53 of the stop 52 corresponding to the diameter of the conductor and wherein the cutting edges 37, 44 are arrested after they have penetrated the insulation but before they can cut the conductor. If a conductor of a larger diameter is to be stripped, the pawl is swung into alignment with a higher step 53 corresponding to the diameter of the conductor. If desired, the pivot 54 of the pawl 51 may be provided with a friction means, such as a spring washer or the like, to retain the pawl in a predetermined position.

*Operation*

The tool 10, in accordance with this invention, is extremely simple and efficient in its operation. The tool 10 is placed over a conductor indicated in broken lines 55 with the jaws 17 and 22 separated to permit insertion of the conductor 55 therebetween. The handles 14 and 19 are then manually squeezed together by the operator to converge the jaws 17 and 22. The blades 32 and 33 of the jaw 17 are juxtaposed to the blades 42 and 43, with the blade 32 overlying the blade 42 and the blade 43 overlying the blade 33. The stop means 46 or 50 is adjusted to a predetermined position corresponding to the size of the conductor. The handles 14 and 19 are then further squeezed to bring the cutting edges 37 and 44 into cutting engagement with the insulation 56 of the conductor 55. With the jaws 17 and 22 held in this position, the operator exerts a pulling force on the handles 19 and 14 along the axis of the conductor 55 to strip the insulation 56 therefrom. If a conductor of a different diameter is to be stripped of its insulation, the adjustment 46 or pawl 51 is suitably adjusted to correspond to the diameter of the conductor, and the stripping is achieved as previously described.

If it is desired to cut or sever a conductor like 55, the adjustment means 46 is backed off or the pawl 51 is swung out of engagement with the stop 52 to permit the cutting edges 37 and 44 to advance sufficiently to cut through the conductor.

In general, this invention features a pair of unitary members having forward and rearward portions. The members are crossed and rotatably secured together at their intermediate portions. The rearwardly extending portions form a convenient handle for manual manipulation by an operator. The forwardly extending portions include inwardly extending opposed jaws which are bifurcated to form angularly disposed discrete cutter blades, the cutter blades being in oppositely overlapping engagement when juxtaposed. V-shaped or other notches having sharpened edges are provided in each jaw to cut through insulation surrounding a conductor, the insulation being stripped from the conductor by manual pull on the handle along the axis of the conductor to remove the insulation. Adjustment means is provided to limit the squeezing action of the handle and thereby limit the inward movement of the jaws to compensate for various diameters of wires without cutting through the wires when stripping the insulation therefrom. If desired, the adjustment means may be adjusted to permit the jaws to close sufficiently to sever the conductor.

While we have herein shown and described what we conceive to be the most desired embodiments of our invention, it is to be understood that alterations and modifications thereof may be made in a manner to satisfy the spirit of our invention which is intended to comprehend any and all equivalent devices as comprehended in the following claims.

What we claim as new and desire to secure by Letters Patent is:

1. A wire stripping and cutting tool, comprising; a pair of members pivoted together intermediate their ends and defining complementary handles on one side of the pivot and jaws on the other side thereof, said jaws extending inwardly toward and overlapping each other and being generally planar in a plane parallel to the axis of said pivot and having front and rear faces, said jaws having opposed sharp-edged notches in their inner edges, the portions of one of said jaws on opposite sides of its notch being relatively offset, one portion overlapping the front face of the other jaw and the other portion overlapping the rear face of said other jaw.

2. A tool as defined in claim 1 wherein each of said notches is of generally V-shape, the edges thereof being respectively bevelled on opposite faces of the jaw to provide said sharp edge on the face of its jaw adjacent the overlapping portion of the other jaw.

3. A tool as defined in claim 1 wherein each of said notches is of generally V-shape, a slit extending outwardly from the apex of each notch and dividing its jaw into said relatively offset portions.

4. A tool as defined in claim 1 including cooperating adjustable stop means on said members for limiting the extent of movement of said jaws toward each other.

References Cited in the file of this patent

UNITED STATES PATENTS

| | | |
|---|---|---|
| 1,644,351 | Pellegrino | Oct. 4, 1927 |
| 2,079,672 | Allen et al. | May 11, 1937 |
| 2,386,327 | Martin | Oct. 9, 1945 |
| 2,609,716 | Forman | Sept. 9, 1952 |
| 2,723,575 | Thomson | Nov. 15, 1955 |
| 2,753,742 | Buchanan | July 10, 1956 |
| 2,868,049 | Radcliffe | Jan. 13, 1959 |

OTHER REFERENCES

Brochure put out by the G.M. Co. Manufacturing, Inc.